United States Patent [19]

Ohuchi

[11] Patent Number: 5,386,895
[45] Date of Patent: Feb. 7, 1995

[54] CURRENT COLLECTOR

[75] Inventor: Eiichi Ohuchi, Kakogawa, Japan

[73] Assignee: Kawasaki Jukogyo Kabushiki Kaisha, Kobe, Japan

[21] Appl. No.: 77,631

[22] Filed: Jun. 17, 1993

[30] Foreign Application Priority Data

Jun. 18, 1992 [JP] Japan .................. 4-186266

[51] Int. Cl.6 ............................................. B60L 5/30
[52] U.S. Cl. ................................. 191/60.5; 191/68
[58] Field of Search .............. 191/50, 60.5, 64, 65, 191/66, 67, 68, 70, 88, 91

[56] References Cited

U.S. PATENT DOCUMENTS

| | | | |
|---|---|---|---|
| 1,278,815 | 9/1918 | Aalborg | 191/65 |
| 3,106,272 | 10/1963 | Mohring | 191/68 X |
| 3,495,051 | 2/1970 | Mohring | 191/68 X |
| 3,823,278 | 7/1974 | Gray | 191/65 X |
| 3,830,990 | 8/1974 | Gray | 191/66 X |
| 4,113,074 | 9/1978 | Stemmann et al. | 191/66 X |

FOREIGN PATENT DOCUMENTS

| | | | |
|---|---|---|---|
| 537011 | 5/1984 | Australia | 191/60.5 |
| 196912 | 4/1958 | Austria | 191/65 |
| 2311680 | 12/1976 | France | 191/65 |
| 1173125 | 7/1964 | Germany | 191/65 |
| 3133625 | 3/1983 | Germany | 191/65 |
| 52-16712 | 2/1977 | Japan | 191/70 |
| 63-21402 | 2/1988 | Japan | . |
| 621966 | 4/1949 | United Kingdom | 191/65 |
| 1134423 | 1/1985 | U.S.S.R. | 191/65 |

OTHER PUBLICATIONS

"Science of Electric Rolling Stock", vol. 45, No. 3, Mar. 1992, Issued by Electric Rolling Stock Society, pp. 37-39, The Latest Technique and Construction of the Pantograph.

Primary Examiner—Michael S. Huppert
Assistant Examiner—Scott L. Lowe
Attorney, Agent, or Firm—Leydig, Voit & Mayer

[57] ABSTRACT

A current collector includes the following members. A frame is mounted at its base end on a movable body. A current collector shoe assembly is mounted on a top end of the frame and is brought into contact with a feeder. A first spring applies a spring force to the frame so as to urge the top end of the frame toward the feeder. A second spring is arranged between the frame and the current collector shoe assembly for pressing the current collector shoe assembly to the feeder. A damper applies a damping force to the vibration of the current collector shoe assembly.

3 Claims, 7 Drawing Sheets 5,386,895

CURRENT COLLECTOR

BACKGROUND OF THE INVENTION

1. Field of the Invention

The present invention relates to a current collector which is attached to a movable body such as electric rolling stock, an overhead crane or the like, and which receives current from a feed.

2. Description of the Related Art

A typical current collector attached to a movable body is generally constructed such that a current collector shoe assembly is attached to a top end of a frame which is mounted at its base end on the movable body, and that such current collector shoe assembly is pressed to a feeder by a main spring applying extensible force to the frame. When the movable body starts moving in this condition, such a pressing force of the current collector shoe assembly varies influenced by vibration of the feeder and a vehicle, and the unevenness of the feeder, or the like. In the worst case, the pressing force might be reduced to nothing, thereby removing the current collector shoe assembly from the feeder, that is, causing pantograph bounce. This further lowers the vehicle performance and causes wear on the feeder and the current collector shoe assembly.

Accordingly, in order to prevent such pantograph bounce, the conventional 1 degree of freedom system including only a main spring is increased by degrees up to 2, 3, and even greater, thereby aiming at improving the performance of the current collector shoe assembly. The relationships between the vibration frequency f of the 1 degree of freedom system and the 2 degrees of freedom system and the allowable amplitude A are shown in FIGS. 10A, 10B and 10C.

In the 1 degree of freedom system of FIG. 10A, S1 is a curve indicating a solution of a vibration equation, and in the range R1 lower than the characteristic curve S1, the vibration of the current collector shoe assembly is allowed, thus enabling normal current collecting without pantograph bounce. In FIG. 10B, S2 and S3 represent the curves indicating the two solutions of the vibration equation of the 2 degrees of freedom system, and in the range R2 having the smaller amplitude A than the smaller value of the two characteristic curves S2 and S3, current collecting can be performed normally.

As will be seen from FIG. 10C as a result of overlapping FIGS. 10A and 10B, the characteristics of the 1 degree of freedom system are superior to those of the 2 degrees of freedom system in the range R3 of a relatively low frequency, and vice versa in the range R4 of a relatively high frequency. That is, the 1 degree of freedom system indicated by the characteristic curve S1 has low current collecting performance (high ratio of pantograph bounce) in a high frequency range, but when the degree of freedom increases, the current collecting performance can be improved in a high frequency range. However, as will be clearly seen from FIG. 10B, in a multi-degrees of freedom system having 2 or greater degrees, the current collecting performance is sharply reduced around the intrinsic frequency $f_0$ of the system. Hence, the closeness of the values of intrinsic frequency of the current collector and that of the movable body causes the continuous occurrence of pantograph bounce, thus considerably reducing the current collecting performance.

Further, in order to prevent pantograph bounce of the current collector of the 1 degree of freedom system, a technique is known such that a single damper applies a damping force only to the downward movement (compressing dimension) of the frame (Masayuki ONODERA "The Latest Techniques and Construction of the Pantograph", *Science of Electric Rolling Stock*, Vol. 45, No. 3, (March 1992), issued by Electric Rolling Stock Society, pp. 37–39). According to this technique, the pantograph bounce of the shoe assembly due to great vibration force from the feeder can be inhibited to some extent, but the current collecting performance cannot be improved in a high frequency range.

SUMMARY OF THE INVENTION

Accordingly, in view of the foregoing conventional problems, an object of the present invention is to provide a current collector in which pantograph bounce can be minimized and in which the current collecting performance can be improved in a wide range of the vibration frequencies.

To achieve this object, the present invention provides a current collector constructed of a 2 degrees of freedom vibration system which comprises a first spring applying a spring force to a frame so as to urge a top end of the frame, which is mounted on a movable body, toward a feeder, and a second spring arranged between the frame and the current collector shoe assembly which is mounted on the top end of the frame and which is brought into contact with the feeder, the current collector further comprising a damper applying a damping force to the vibration of the current collector shoe assembly.

According to the present invention, a 2 degrees of freedom vibration system including a damping force can be constructed. Such a vibration system has intermediate characteristics between the 1 degree of freedom system (See FIG. 10A) equivalent to the 2 degrees of freedom system having the infinite damping force of the damper and the 2 degrees of freedom system having no damping force (See FIG. 10B). As a result, sufficient amplitude can be allowed in a wide range of frequencies.

DESCRIPTION OF THE PREFERRED EMBODIMENTS

An embodiment of the present invention will be described with reference to the drawings.

Figure 1:
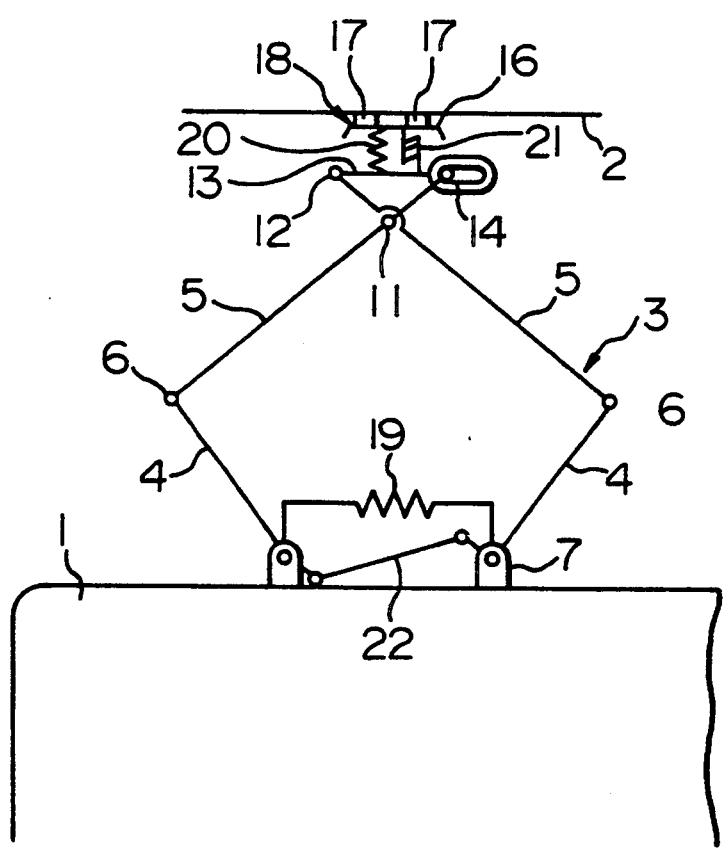
FIG. 1 is a schematic side view showing a current collector of a first embodiment according to the present invention.

As shown in a schematic side view of FIG. 1, a current collector of the present invention is a pantograph which is mounted on a movable body 1 such as a train or the like, and receives current from a feeder 2. In the current collector, a frame generally denoted by 3 is mounted on the movable body 1 in such a way that lower frame members 4 and upper frame members 5 are interconnected by support pins 6 so as to be able to pivotably extend and compress relatively, and that base ends (bottom ends) of the lower frame members 4 are supported by bearings 7 secured to the roof of the movable body 1.

A pair of front and rear upper frame members 5 are pivotably interconnected to each other on their top ends by way of a pivot 11 so as to form an X shape as viewed from their side. The top end of one upper frame member 5 is connected to one end (left end) of a link 13 by way of a support pin 12, and the top end of the other upper frame member 5 is connected to the other end (right end) of the link 13 by way of a sliding support pin 14. A current collector shoe assembly generally denoted by 18 having a pair of sliders 17, 17 on top of a shoe 16 is disposed above the link 13.

A first spring 19 (main spring) for applying a spring force so as to urge the end (top end) of the upper frame members 5, that is, the end of the frame 3 toward the feeder 2, and a link mechanism 22 for driving the pivot 11 on the top end of the frame 3 to move rectilinearly and vertically are arranged at the bottom end of the lower frame members 4. A second spring 20 is arranged between the the link 13 and the current collector shoe assembly 18 in order to press the current collector shoe assembly 18 to the feeder 2. Further, a damper 21 is connected parallel to the second spring 20, thereby adding damping force to the vertical vibration of the current collector shoe assembly 18.

A description will now be specifically given of the construction of the essential portions of the current collector.

Figure 2:
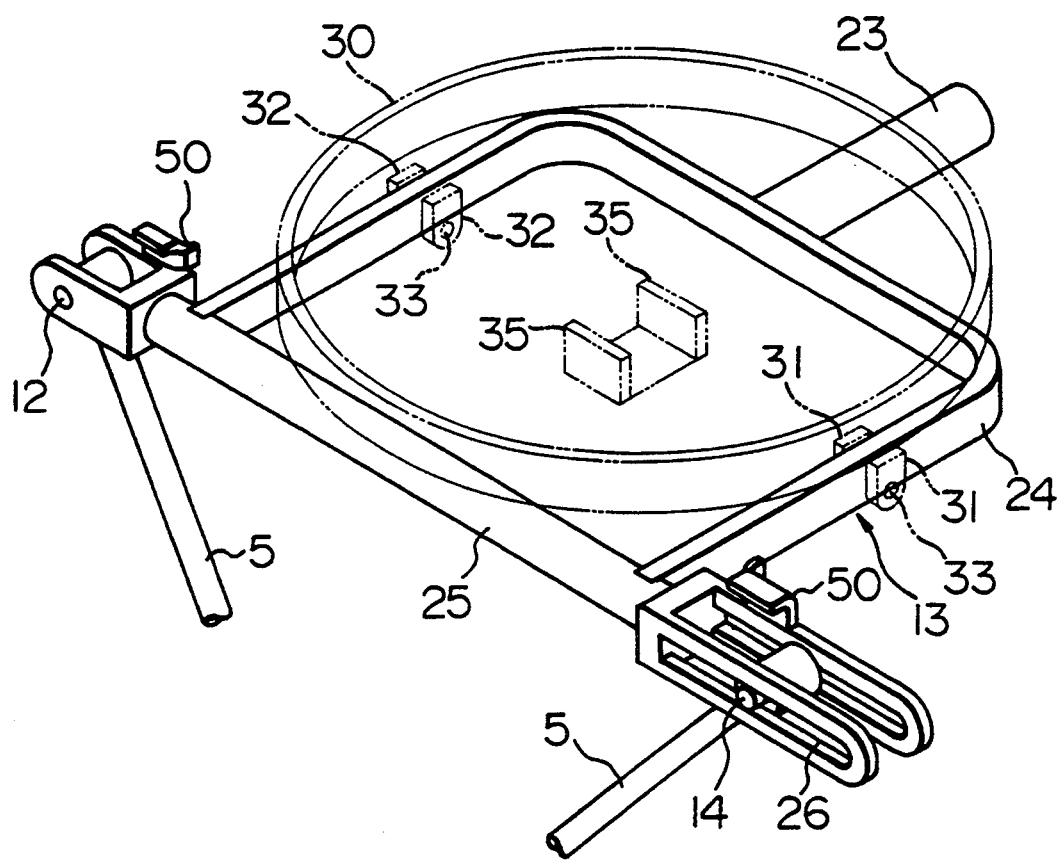
FIG. 2 is an enlarged perspective view showing a link of the same embodiment.

As illustrated in FIG. 2, the link 13 is constructed as follows. A U-shaped frame 24 is secured to both ends (only one end is shown) of a bar 23, and a side tube 25 is secured to both ends of the the U-shaped frame. The support pin 12 is supported at one end of the side tube 25 and the sliding support pin 14 is supported in a slide groove 26 arranged at the other end of the side tube 25. A spring bearing plate 30 is disposed above the U-shaped frame 24, which plate 30 is rockably attached to the U-shaped frame 24 by pins 33 inserted through a pair of brackets 31 and 32 secured at the bottom of the plate 30.

Figure 3:
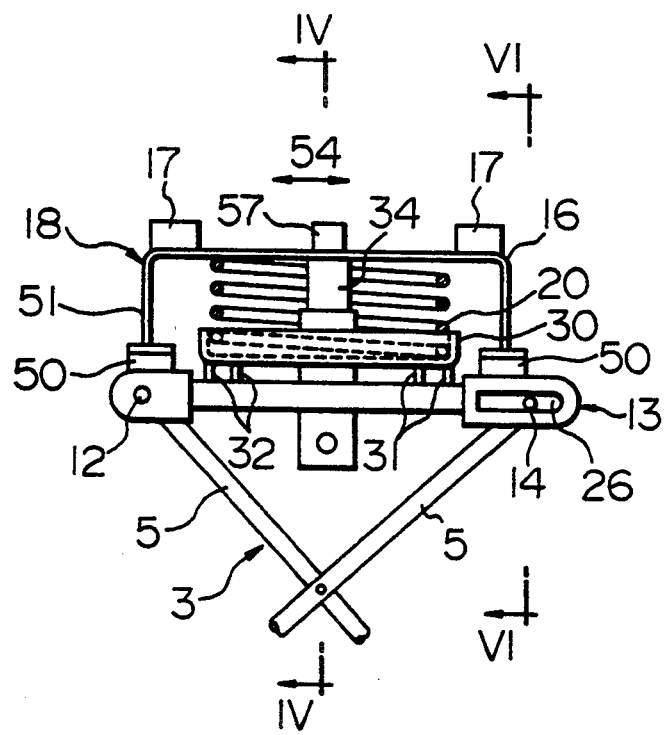
FIG. 3 is a side view of essential portions of the same embodiment.

As shown in FIG. 3, the second spring 20 is arranged between the spring bearing plate 30 and the shoe 16 of the current collector shoe assembly 18 positioned above the plate 30, thereby intervening the second spring 20 between the frame 3 and the current collector shoe assembly 18. The spring bearing plate 30 and the current collector shoe assembly 18 are connected in a construction such as in FIGS. 4 and 5. More specifically, a sliding plate 34 is welded to the shoe 16, and each of a pair of fitting strips 39 is fastened to one of the projections 35, which are integrally bent-formed with the spring bearing plate 30, by means of bolts 37 and nuts 38 with intervening spacers 36. Each of the friction plates 40 having a greater coefficient of surface friction is intervened between the sliding plate 34 and one of the two fitting strips 39. A bolt 41 is inserted, passing through the sliding plate 34, the fitting strips 39 and the friction plates 40.

A spring 45 is arranged around the bolt 41, which spring 45 is pressed by the fitting strips 39 by way of a check plate 47 positioned by a double nut 46. Thus, a predetermined friction is added between the sliding plate 34 and each of the fitting strips 39, that is, between the current collector shoe assembly 18 and the spring bearing plate 30 on the side of the frame 3.

A hole punched through the fitting strips 39 and the friction plates 40 for inserting the bolt is formed to be a round hole which diameter is slightly bigger than that of the bolt. On the other hand, a hole punched through the sliding plate 34 for inserting the bolt is formed to be a slide hole 42 having a vertically elongated shape, thereby enabling the relatively vertical motion between the sliding plate 34 and the fitting strips 39, that is, between the current collector shoe assembly 18 and the spring bearing plate 30 on the side of the frame 3.

Figure 4:
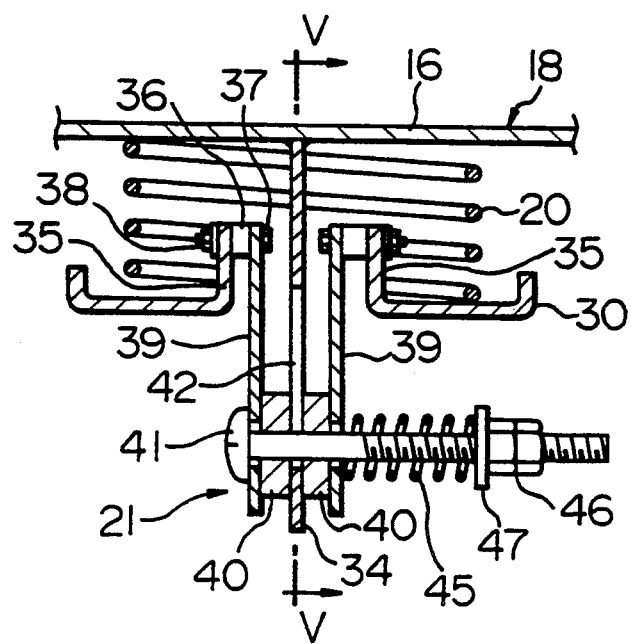
FIG. 4 is a sectional view taken on line IV—IV of FIG. 3.

As stated above, the spring bearing plate 30 and the current collector shoe assembly 18 are interconnected to each other with a predetermined friction so that they are vertically movable relatively by means of the damper of a sliding friction type 21 comprising the sliding plate 34, the fitting strips 39, the friction plates 40, the bolt 41, the slide hole 42, the spring 45, the double nut 46, and the check plate 47 shown in FIG. 4, and by means of the second spring 20 connected parallel to the damper 21.

Figure 5:
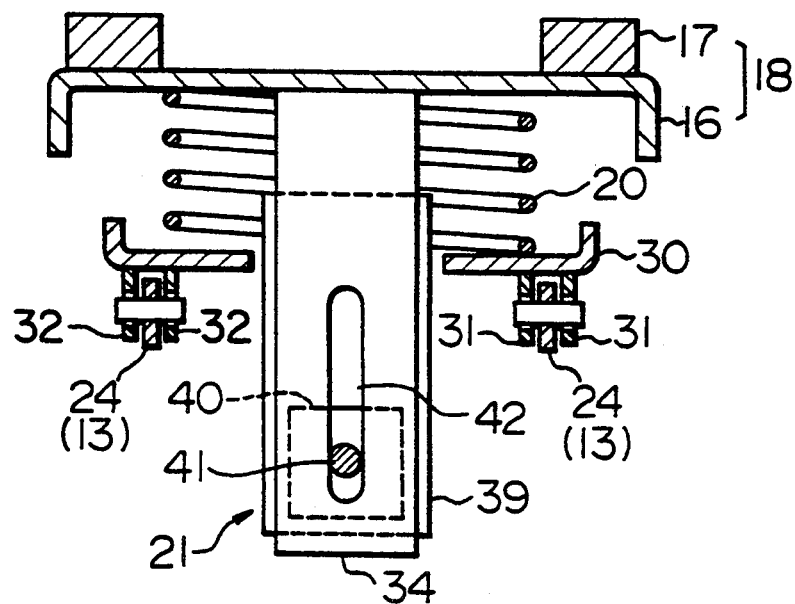
FIG. 5 is a sectional view taken on line V—V of FIG. 4.

Each of a pair of stoppers 50 are arranged on one of the end of the side tube 25 shown in FIG. 2. A locking piece 51 projects from the shoe 16 of the current collector shoe assembly 18, and the locking piece 51 abuts against the stopper 50, thereby controlling the horizontal displacement of the current collector shoe assembly 18 as indicated by the arrow 53 in FIG. 6 and the displacement of the movement of the movable body as indicated by the arrow 54 in FIG. 3. The current collector shoe assembly 18 shifts downwards, controlled by the engagement of a side bottom end 56 of the shoe 16 and the stopper 50 shown in FIG. 6, and on the other hand, the current collector shoe assembly 18 shifts upwards, controlled by the engagement of the bolt 41 and the bottom end of the slide hole 42 as shown in FIG. 5.

Figure 6:
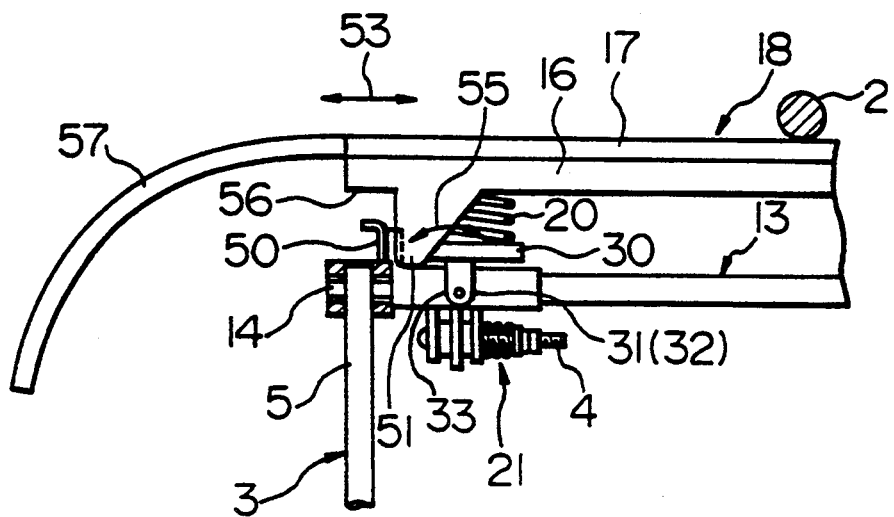
FIG. 6 is a partially sectional view taken on line VI—VI of FIG. 3 as viewed from the arrow in FIG. 3.

The spring bearing plate 30 is supported by the link 13 so as to be rockable as indicated by arrow 55 of FIG. 6 via the pin 33 passing through the brackets 31 and 32, as illustrated in FIG. 6. Thus, the spring bearing plate 30 is supported by the link 13 by way of the pin 33 inserted through the brackets 31 and 32 so as to be able to rock as indicated by the arrow 55 in FIG. 6 in accordance with the inclination of the current collector shoe assembly 18 which follows the position of the feeder 2. Thus, the second spring 20 can be stabilized. A guide 57 is secured to the shoe 16.

Figure 7:
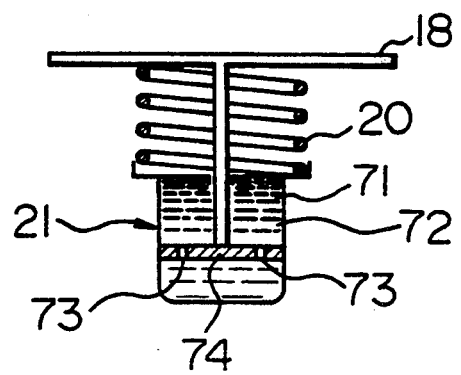
FIG. 7 is a schematic view showing a construction of a modified example of a damper.

It should be noted that the damper 21 is not limited to a sliding friction type damper as described in the foregoing embodiment. For example, as depicted in FIG. 7, the damper 21 of the following type can be used for the current collector of the present invention. Such a damper 21 is constructed such that a piston 74 including an orifice 73 is laid in a fluid chamber 72 enclosing a fluid 71, thereby utilizing viscosity resistance of the fluid 71.

In the construction described above, the spring force of the first spring 19 is applied so as to urge the frame 3 toward the feeder 2 (upwards), as illustrated in FIG. 1. The second spring 20 and the damper 21 are connected parallel to each other as shown in FIG. 4, and thus, this vibration system is classified as 2 degrees of freedom system with a damper illustrated in FIG. 8. In the drawing, M1 and M2 represent the mass of the frame 3 and that of the current collector shoe assembly 18 of FIG. 1, respectively, and K1 and K2 represent the spring constant of the first spring 19 and that of the second spring 20, respectively.

Figure 9:
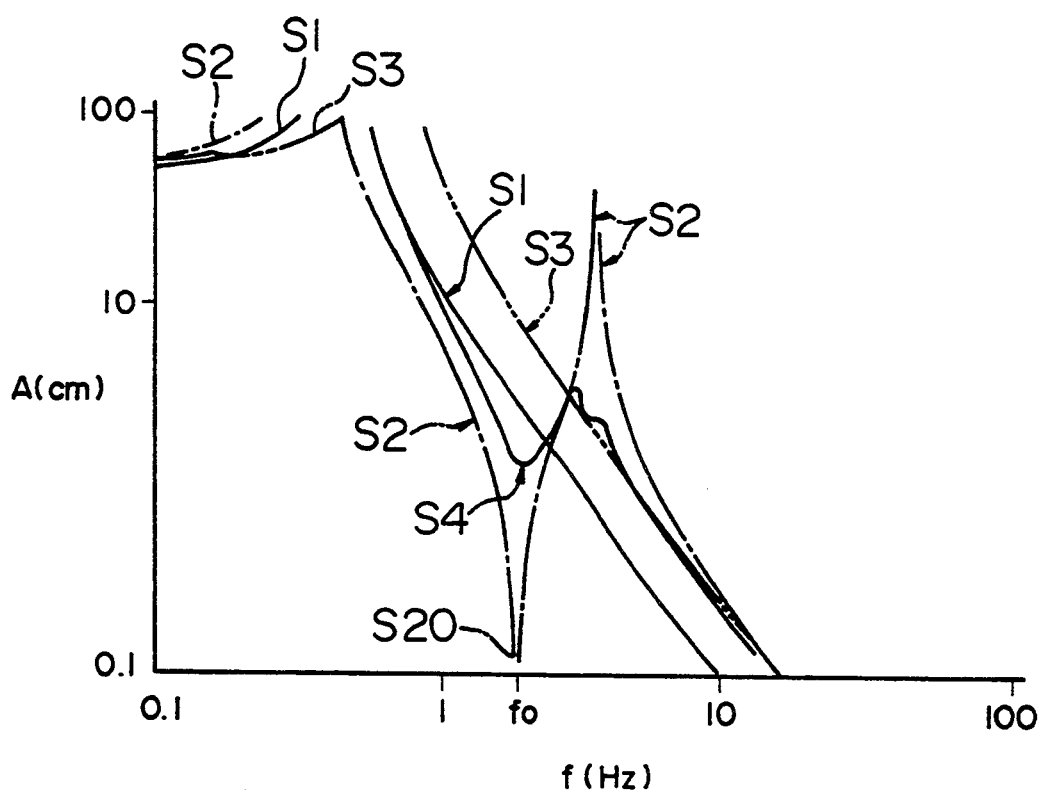
FIG. 9 is a graph showing calculation results of the vibration system.
Figure 10A:
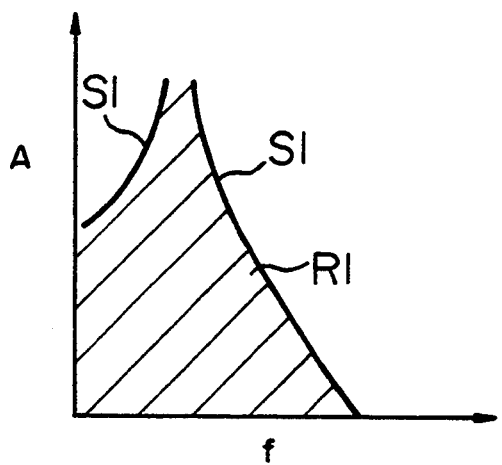
FIG. 10A is a graph showing a vibration characteristic of the 1 degree of freedom system.
Figure 10B:
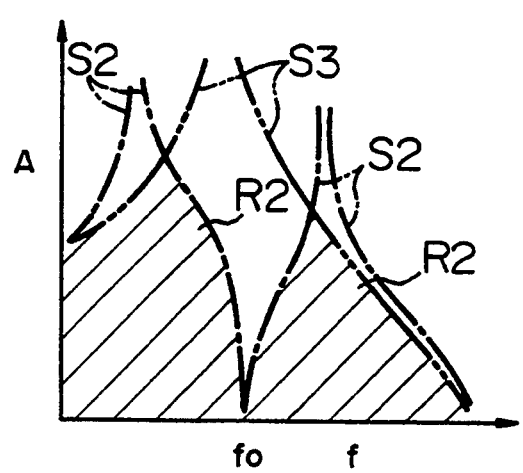
FIG. 10B is a graph showing a vibration characteristic of the 2 degrees of freedom system.
Figure 10C:
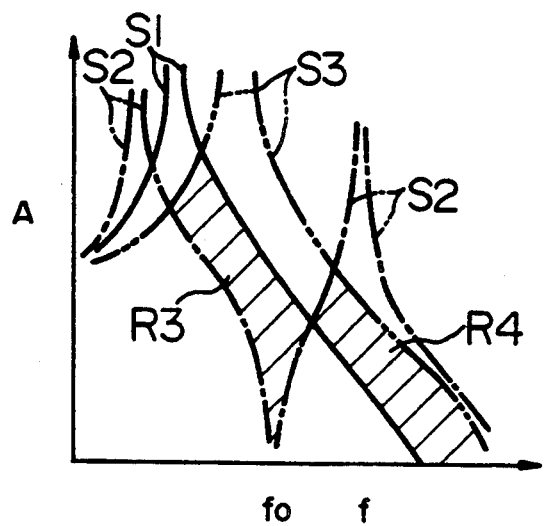
FIG. 10C is a graph showing the vibration characteristics of both the 1 degree of freedom system and the 2 degrees of freedom system.

FIG. 9 shows a characteristic curve S4 of the 2 degrees of freedom system with a damper according to the present invention, which is obtained by mathematical calculation. In comparison with S4, FIG. 9 also indicates a characteristic curve S1 of 1 degree of freedom system including only the first spring 19 (without a damper) and characteristic curves S2 and S3 of 2 degrees of freedom system including the first and second springs 19 and 20 (without a damper). S1–S3 are identical to those of FIGS. 10A and 10B. The mass M1 of the 1 degree of freedom system is a total of the mass of the two M1 and M2 of the 2 degrees of freedom system. The numerical values used for calculations are as follows.

Mass: M1=8 kg
Mass: M2=5 kg
Spring constant: K1=0.1 kgf
Spring constant: K2=1 kgf
Push-up force: P=5 kgf
Friction coefficient: Fs=1 kgf where the push-up force represents the force exerted by which the current collector assembly 18 of FIG. 1 pushes up the feeder 2, and where the friction coefficient indicates the one between the current collector shoe assembly 18 and the feeder 2.

As will be clearly understood from the calculation results of FIG. 9,

A) The 1 degree of freedom system characterized by the characteristic curve S1 has a great allowable amplitude A in a low frequency range (approximately 1 Hz or less). Also, the allowable amplitude A of the current collector shoe assembly does not drop sharply although the frequency varies.

B) The allowable amplitude A of the 2 degrees of freedom system is the smaller value between the two characteristic curves S2 and S3 which are equivalent to the two solutions. Such allowable amplitude A is greater in a high frequency range (approximately 2.5 Hz or greater) than that of the 1 degree of freedom system. However, a portion S20 having almost no allowable amplitude around the resonance frequency $$f_0 = (\tfrac{1}{2}\pi) \cdot [(K1+K2)/M1]^{\tfrac{1}{2}}$$

is detected, where the current collecting performance is extremely lowered.

C) In comparison with A) and B), the 2 degrees of freedom system with a damper according to the present invention is a vibration system having intermediate characteristics between the 1 degree of freedom system equivalent to the system according to the present invention having the infinite damping force of the damper and the 2 degrees of freedom system having no damping force. Therefore, the characteristic curve S4 is between the characteristic curve S1 of the 1 degree of freedom system and those of S2 and S3 of the 2 degrees of freedom system.

As shown in the characteristic curve S4, the sufficient amplitude A can be obtained in both high and low frequency ranges. In addition, the portion S20 having almost no allowable amplitude in the 2 degrees of freedom system of B) is remarkably improved around the resonance frequency $f_0$ of the intermediate frequency range (between approximately 1–2.5 Hz), thus allowing sufficient amplitude of the current collector shoe assembly. In particular, the intermediate frequency range falls on an important range of the essential vibration frequency when the movable body is a train. Hence, the improvement of the current collecting performance in such a range is extremely meaningful.

The damper 21 of FIG. 1 may be connected parallel to the first spring 19. However, the following advantages can be obtained when the damper 21 is connected parallel to the second spring 20 as illustrated in FIG. 1, thereby intervening them between the mass M1 and M2.

Figure 8:
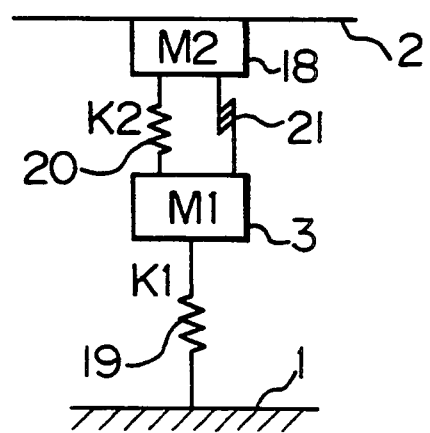
FIG. 8 is an equivalent diagram to a vibration system of the present invention.

More specifically, it is important to inhibit the free vibration of the mass M1 shown in FIG. 8 in order to reduce pantograph bounce. To achieve this purpose, two cases may be considered, that is, when the damper 21 is connected parallel to the first spring 19, and when it is connected parallel to the second spring 20. Practically, the damper 21 needs to be unavoidably bulky when it is connected parallel to the first spring 19. Moreover, the motion of mass M1 cannot travel fully but only partially, and thus the damping force might not sufficiently influence the current collector due to the looseness of the connection of the machine, or the like.

The pantograph comprising the upper frame members 5 and the lower frame members 4 deforms due to vibration. Thus, when the damper 21 is connected parallel to the first spring 19, the motion of the mass M1 represented by the pivot 11 indicated in FIG. 1 might not unfavorably travel to the damper 21. On the other hand, when the damper 21 is connected parallel to the second spring 20, the motion of the mass M1 travels to the damper 21 without fail, thus improving the reliability.

The present invention may be applicable to the current collector used not only for electric rolling stock, but also for movable industrial machines such as an overhead crane, or the like.

As stated above, according to the present invention, the current collector is formed of a vibration system of 2 degrees of freedom having a damping force. Such a vibration system has intermediate characteristics between the 1 degree of freedom system and the 2 degrees of freedom system without a damper. As a result, pantograph bounce can be prevented in a wide frequency range, thus improving the current collecting performance.

What is claimed is:

1. A current collector attached to a movable body and receiving current from a feeder; said current collector comprising:

a frame having a top end and a base end, the base end being mounted on said movable body;

a current collector shoe assembly mounted on the top end of said frame and contacting the feeder;

a first spring for applying a spring force to said frame so as to urge the top end of said frame toward the feeder;

a second spring arranged between said frame and said current collector shoe assembly for pressing said current collector shoe assembly to said feeder; and a damper disposed in parallel to said second spring for applying a damping force to damp the vibration of said current collector shoe assembly.

2. A current collector as claimed in claim 1 further comprising a spring bearing plate pivotally attached to said frame and positioned between said second spring and said frame.

3. A current collector as claimed in claim 2 wherein said damper includes:

a sliding plate secured to said current collector shoe assembly;

a fitting strip having first and second ends, the first end being engage with said spring bearing plate;

a friction plate disposed between said fitting strip and said sliding plate; and a pressing means for pressing said fitting strip elastically towards said sliding plate.

* * * * *